UNITED STATES PATENT OFFICE.

ISAAC WINSLOW, OF PHILADELPHIA, PENNSYLVANIA, ASSIGNOR TO JOHN W. JONES, OF PORTLAND, MAINE.

IMPROVEMENT IN PRESERVING GREEN CORN.

Specification forming part of Letters Patent No. 35,274, dated May 13, 1862.

*To all whom it may concern:*

Be it known that I, ISAAC WINSLOW, of Philadelphia, in the county of Philadelphia and State of Pennsylvania, have invented a new and useful Improvement in Preserving Green Corn; and I do hereby declare that the following is a full and exact description thereof, reference being had to the accompanying drawing, and to the letters of reference marked thereon.

It has long been common to boil green or unripened Indian corn or maize and then dry the same for winter use; but corn thus dried, when prepared for the table by again boiling, is more or less hard and insipid, having lost the fine flavor of fresh green corn. If ears of corn be boiled and then hermetically sealed in cans, the cob seems to absorb the sweetness of the kernels; or if the kernels are removed from the cob after boiling and then preserved the finest flavor of the natural corn is lost.

After many and varied attempts to preserve green corn without drying the same, finding that I did not obtain a satisfactory result, I finally conceived the idea of first removing the corn from the cob and then boiling or cooking the kernels thus separated and preserving them; but this was met by a new difficulty. The kernels of corn being somewhat broken by removal from the cob, the milk and other juices were dissolved out in the process of boiling, and thus the corn was left insipid and unpalatable. I then attempted to cook the corn without contact with water by exposing the cans containing the corn to boiling water. This mode of preserving I found unsatisfactory. The milk of the corn was evaporated and the corn more or less dried, while a long time was requisite to cook the corn sufficiently for preservation. Finally, I adopted the process of removing the corn from the cob, packing the kernels in cans, hermetically sealing the same, and then boiling the cans until the corn therein contained became completely cooked. The result of this process was extraordinary, the corn being of finer flavor than corn fresh from the field when boiled upon the cob in the usual way. Since this discovery I have adopted the practice of boiling or steaming the cans containing the corn-kernels, thus sealed, about four hours, though a shorter time may answer for most purposes. The cans should be very strong, so as to prevent their bursting by heat. I have sometimes practiced puncturing the cans after they are well heated—say for ten minutes. This allows the air to escape, when I immediately reseal the cans, so as to prevent the evaporation of the corn or the loss of the natural aroma. This puncturing has two advantages. It prevents the possible bursting of the cans and allows the heads of the cans to press inward when cool, so that dealers can see by this test that the corn is perfectly preserved. When the cans are not punctured, their ends will remain pressed outward after cooling, and yet the corn is perfectly preserved.

The above-described process of removing the corn from the cob and then preserving the kernels affords several advantages over any method of preserving corn heretofore known. Among these advantages are the following: First, the peculiar sweetness and excellent flavor of the corn thus preserved, these qualities being consequent upon retaining all the milk and other juices, together with its fine natural aroma; second, the economy of space in boiling and packing and convenience of handling, transportation, and sale.

Having thus fully described my improved process, what I claim, and desire to secure by Letters Patent of the United States, is—

The above-described process of first removing the corn from the cob and then preserving the kernels, substantially in the manner and for the purposes set forth.

ISAAC WINSLOW.

Witnesses:
SAMUEL C. OGLE,
WILLIAMS OGLE.